US007243022B1

(12) United States Patent
Voto et al.

(10) Patent No.: US 7,243,022 B1
(45) Date of Patent: Jul. 10, 2007

(54) APPARATUS FOR COMMUNICATING INLET AIR PARAMETERS OF AN INTERNAL COMBUSTION ENGINE

(75) Inventors: Andrew M. Voto, Brighton, MI (US); Salem Ahmad Fayyad, Grand BLanc, MI (US); Andrew A. Wassef, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/377,826

(22) Filed: Mar. 16, 2006

(51) Int. Cl.
*G06F 17/00* (2006.01)

(52) U.S. Cl. ...................................................... 701/115

(58) Field of Classification Search ................ 701/115, 701/101, 102; 73/118.2; 123/399, 361
See application file for complete search history.

(56) References Cited

U.S. PATENT DOCUMENTS 4,343,183 A * 8/1982 Plapp ...................... 73/204.15
5,520,146 A * 5/1996 Hrovat et al. ............... 123/336
6,955,080 B1 * 10/2005 Verdejo ..................... 73/118.2

* cited by examiner

*Primary Examiner*—Hieu T. Vo
(74) *Attorney, Agent, or Firm*—Paul L. Marshall

(57) ABSTRACT

Measured engine inlet air temperature and flow parameters are communicated to an engine controller with a single waveform. A variable frequency digital input signal representative of inlet air flow is combined with a variable amplitude analog signal representative of inlet air temperature, and supplied as a single input signal to the engine controller. The controller includes a buffer circuit that re-creates the variable frequency digital signal from the input waveform for application to an input capture circuit that measures the flow-related frequency, and an analog-to-digital converter that is coordinated with the input capture circuit for sampling the temperature-related amplitude.

3 Claims, 3 Drawing Sheets

APPARATUS FOR COMMUNICATING INLET AIR PARAMETERS OF AN INTERNAL COMBUSTION ENGINE

TECHNICAL FIELD

The present invention is directed to apparatus for sensing and communicating inlet air parameters of an internal combustion ignition engine, and more particularly to apparatus for communicating sensed temperature and flow data to an engine control module with a single waveform.

BACKGROUND OF THE INVENTION

The control and diagnosis of a vehicular internal combustion engine is typically carried out by a central microprocessor-based controller in response to numerous input signals representing various engine operating parameters. The various input signals are developed by individual sensor devices, and each such signal is ordinarily communicated to the central controller with a dedicated conductor or conductor pair. Since this arrangement obviously requires a large number of wires and controller input ports, what is needed is a more cost-effective way of communicating the required data.

SUMMARY OF THE INVENTION

The present invention is directed to an improved apparatus for communicating measured engine inlet air temperature and flow parameters to an engine controller with a single input. A variable frequency digital input signal representative of inlet air flow is combined with a variable amplitude analog signal representative of inlet air temperature, and supplied as a single waveform to the engine controller. The controller includes a buffer circuit that recreates the variable frequency digital signal from the input waveform for application to an input capture circuit, and an analog-to-digital converter that is coordinated with the input capture circuit for sampling the temperature-related amplitude.

BRIEF DESCRIPTION OF THE DRAWINGS

The present invention will now be described, by way of example, with reference to the accompanying drawings, in which:—

DETAILED DESCRIPTION OF THE DRAWINGS

Figure 1:
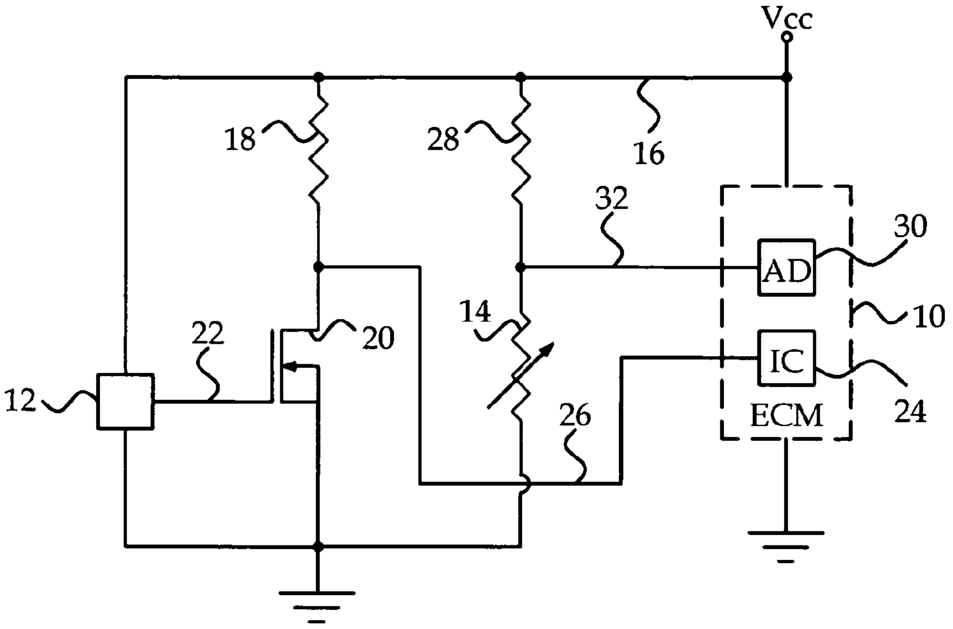
FIG. 1 PRIOR ART
FIG. 1 is a diagram of a prior art inlet air data acquisition circuit for a motor vehicle engine.
Figure 2:
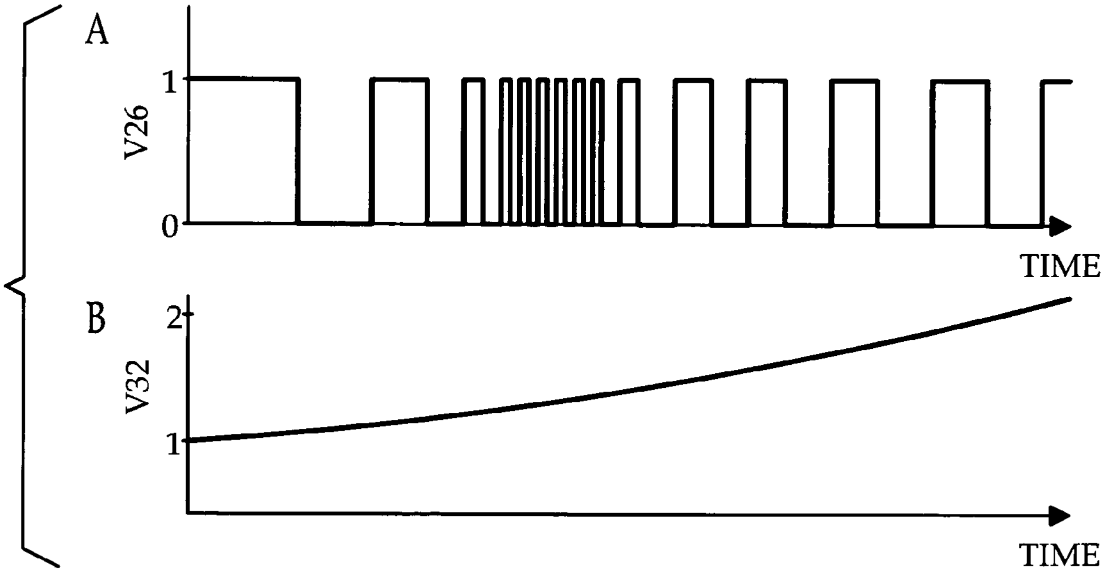
FIG. 2 PRIOR ART
FIG. 2, Graphs A and B, depict exemplary inlet air sensor waveforms developed by the prior art data acquisition circuit of FIG. 2. Graphs A and B respectively depict inlet air flow and inlet air temperature as a function of time.

FIGS. 1 and 2 depict a typical prior art engine control mechanization involving a microprocessor-based engine control module (ECM) 10, an inlet air flow sensor 12 and an inlet air temperature sensor 14. The inlet air flow sensor 12 is switching-type sensor of the type produced and sold by Delphi Automotive Systems Corporation and others, and produces an output on line 22 that varies in frequency with the sensed inlet air flow. The inlet air temperature sensor 14 may be a thermistor, and has an electrical resistance that varies in magnitude with the sensed inlet air temperature. Both the ECM 10 and the sensors 12 and 14 are powered by a regulated signal level voltage Vcc on line 16.

The switching output of sensor 12 on line 22 is applied to a buffer circuit comprising pull-up resistor 18 and N-Channel MOSFET 20. Line 22 is applied to the gate terminal of MOSFET 20, and the voltage at the drain terminal of MOSFET 20 is supplied as an input to an input capture (IC) circuit 24 of ECM 10 via line 26. Graph A of FIG. 2 depicts an exemplary variation of the input voltage V26 for a condition under which the inlet air flow progressively increases (resulting in a progressively increasing frequency) and then decreases (resulting in a progressively decreasing frequency). The input capture circuit detects the rising edges of the voltage V26 on line 26, and measures the time between successive rising edges as an indication of the signal period; the ECM 10 then converts the period to a corresponding inlet air flow.

The inlet air temperature sensor 14 and a reference resistor 28 are coupled across the supply voltage Vcc, and the voltage at their junction is coupled to an analog-to-digital (AD) converter circuit 30 within ECM 10 via line 32. In the illustrated embodiment, the sensor 14 exhibits a positive temperature coefficient, resulting in increased electrical resistance as the inlet air temperature increases. The input voltage V32 on line 32 for a progressively increasing inlet air temperature is depicted for illustration in Graph B of FIG. 2. The AD circuit 30 periodically converts the analog voltage V32 into a digital number, and ECM 10 converts the digital number into a corresponding inlet air temperature.

Figure 3:
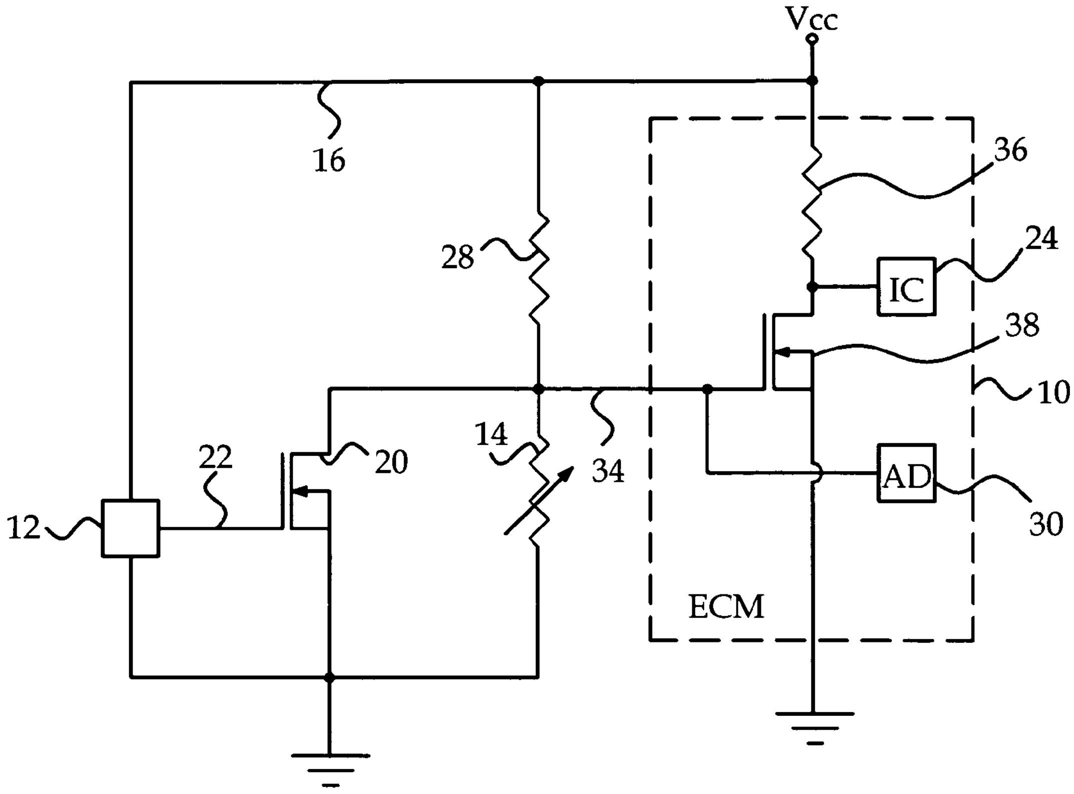
FIG. 3 is a diagram of an inlet air communication apparatus according to this invention, including a microprocessor-based engine controller.
Figure 4:
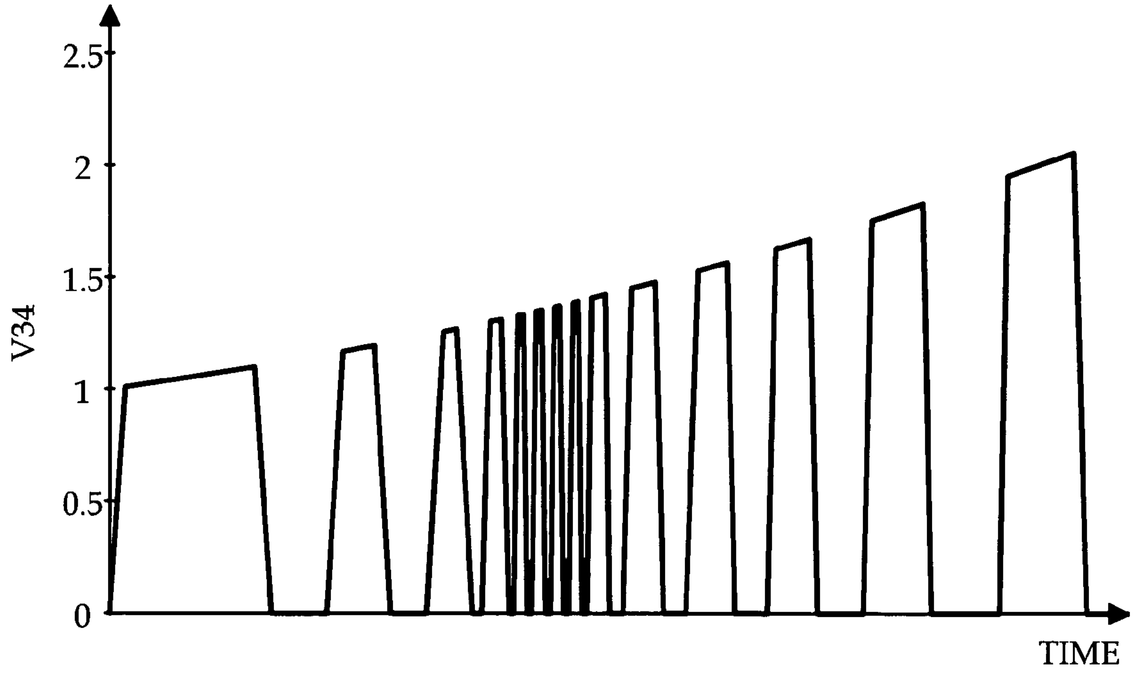
FIG. 4 graphically depicts an inlet air parameter waveform developed by the apparatus of FIG. 3.
Figure 5:
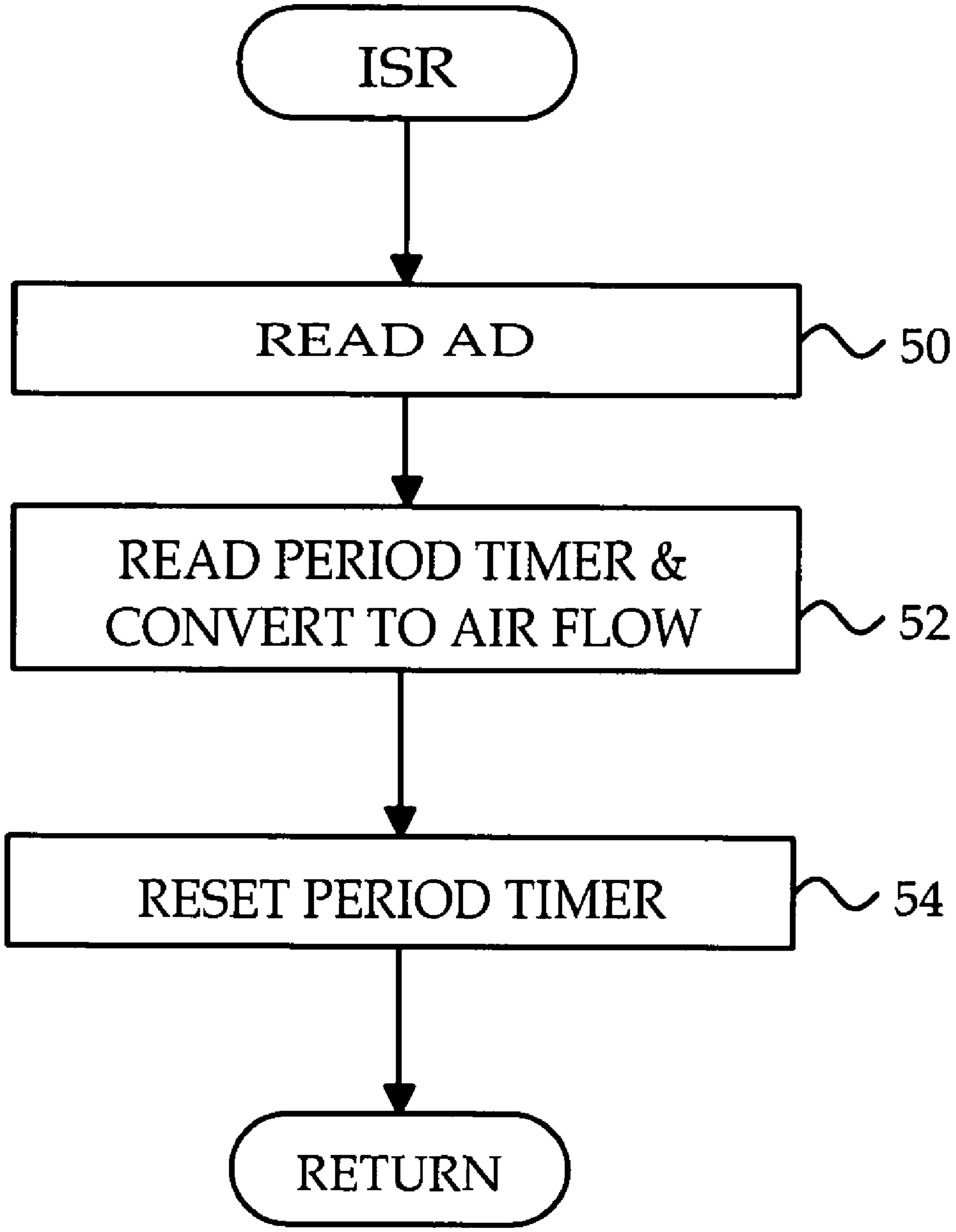
FIG. 5 is a flow diagram representative of a software routine executed by the engine controller of FIG. 3 according to this invention.

As indicated above, the present invention provides a way of reducing the number of input signals supplied to ECM 10 with no loss in input data by combining the information detected by sensors 12 and 14 into a single input waveform that is easily processed by ECM 10. Referring to FIG. 3, this is achieved by coupling the drain of MOSFET 20 to the junction between reference resistor 28 and the inlet air temperature sensor 14, and supplying the voltage at that junction as an input to ECM 10 via line 34. The function of the pull-up resistor 18 of FIG. 1 is provided by the reference resistor 28, eliminating one external resistor. FIG. 4 depicts the voltage V34 on line 34 for the same exemplary data depicted in Graphs A and B of FIG. 2. Thus the combined waveform V34 has a frequency corresponding to the voltage V26 of Graph A, and a peak amplitude corresponding to the voltage V32 of Graph B. Within ECM 10, the voltage V34 is applied to the AD circuit 30 and to a buffer circuit comprising the resistor 36 and the N-Channel MOSFET 38. The voltage V34 is applied to the gate terminal of MOSFET 36, and the voltage at the drain terminal of MOSFET 36 is supplied as an input to the input capture (IC) circuit 24. Since the signal applied to the input capture circuit 24 is inverted with respect to the voltage V34, the input capture circuit 24 identifies rising edges of the voltage V34 by detecting falling edges of the signal at the drain of MOSFET 36. At each such falling edge, the input capture circuit 24 signals ECM 10 to execute an interrupt service routine (ISR) for obtaining the sensed inlet air parameters. The interrupt service routine, depicted in FIG. 5, signals ECM 10 to read the output of AD circuit 30 (block 50), reads a period timer (block 52) and then resets the timer (block 54). In this way, the AD reading reflects the peak amplitude of the input voltage V34, and the timer reading reflects its period. If desired, the block 52 can also convert the timer value to a corresponding inlet air flow value as indicated.

In summary, the apparatus of the present invention reduces wiring complexity and the number of controller inputs required in a typical engine control application. While described in reference to the illustrated embodiments, it is expected that various modifications in addition to those mentioned above will occur to those skilled in the art. For example, the buffer circuits may be implemented with comparators instead of transistors, and so on. Accordingly, it will be understood that systems incorporating these and other modifications may fall within the scope of this invention, which is defined by the appended claims.

The invention claimed is:

1. Apparatus for communicating sensed air flow and air temperature data, comprising:

an air flow sensor for producing a first output that varies in frequency with the sensed air flow;

an air temperature sensor for producing a second output that varies in magnitude with the sensed air temperature;

input circuit means for combining the first and second outputs to form a third output that varies in frequency with the sensed air flow and varies in magnitude with the sensed air temperature; and means including a controller for receiving the third output, measuring a frequency of said third output as an indication of said sensed air flow, and measuring a peak amplitude of said third output as an indication of said sensed air temperature.

2. The apparatus of claim 1, wherein said controller includes an analog-to-digital converter for producing a digital representation of said third output, buffer means for detecting a rising edge of said third output, and means for sampling said digital representation when said buffer means detects said rising edge.

3. The apparatus of claim 1, wherein said input circuit means includes a reference resistor connected in series with said air temperature sensor across a voltage source, and a transistor connected in parallel with said air temperature sensor and biased on and off by said air flow sensor, said third output being defined by a voltage at a junction between said reference resistor and said air temperature sensor.

* * * * *